(12) United States Patent
Hyde (10) Patent No.: US 10,179,620 B2
(45) Date of Patent: Jan. 15, 2019

(54) MODULAR CYCLE STORAGE APPARATUS

(71) Applicant: Craig Oliver Hyde, Queensland (AU)

(72) Inventor: Craig Oliver Hyde, Queensland (AU)

( * ) Notice: Subject to any disclaimer, the term of this patent is extended or adjusted under 35 U.S.C. 154(b) by 38 days.

(21) Appl. No.: 15/546,759

(22) PCT Filed: Aug. 6, 2015

(86) PCT No.: PCT/AU2015/050446
§ 371 (c)(1),
(2) Date: Jul. 27, 2017

(87) PCT Pub. No.: WO2016/019440
PCT Pub. Date: Feb. 11, 2016

(65) Prior Publication Data
US 2018/0009493 A1   Jan. 11, 2018

(30) Foreign Application Priority Data

Aug. 6, 2014   (AU) ................................ 2014903051

(51) Int. Cl.
*B62H 3/08* (2006.01)
*E04H 6/00* (2006.01)
*B62H 3/12* (2006.01)

(52) U.S. Cl.
CPC ................. *B62H 3/12* (2013.01); *B62H 3/08* (2013.01); *E04H 6/005* (2013.01)

(58) Field of Classification Search
CPC .... B62H 3/04; B62H 3/08; B62H 3/12; E04H 6/005; E04H 6/00
See application file for complete search history.

(56) References Cited

U.S. PATENT DOCUMENTS

| | | | |
|---|---|---|---|
| 3,603,459 A * | 9/1971 | Erb .......................... | B62H 3/08 211/20 |
| 7,021,474 B2 * | 4/2006 | Garcia Simon .......... | B62H 3/04 211/20 |

(Continued)

FOREIGN PATENT DOCUMENTS

| | | |
|---|---|---|
| EP | 2447136 | 5/2012 |
| JP | 2003-155833 | 5/2003 |

(Continued)

OTHER PUBLICATIONS

International Search Report; PCT/AU2015/050446; dated Feb. 11, 2016.

*Primary Examiner* — Kimberley S Wright
(74) *Attorney, Agent, or Firm* — Hartman Global IP Law; Gary M. Hartman; Domenica N. S. Hartman (57) ABSTRACT

A modular cycle storage apparatus including at least one at least partially arcuate fixed trunk assembly extending upwardly from the mounting surface, at least one arcuate movable arm assembly mounted relative to the at least one fixed trunk assembly and movable relative thereto between an extended, lower position and a retracted, elevated position, and at least one lower arm assembly mounted relative to a lower portion of the at least one fixed trunk assembly and beneath the at least one arcuate movable arm assembly, each of the at least one arcuate movable arm assembly and the at least one lower arm assembly adapted to mount a cycle for at least temporary storage.

15 Claims, 9 Drawing Sheets

(56) References Cited

U.S. PATENT DOCUMENTS

| | | | | |
|---|---|---|---|---|
| 7,472,517 | B2 * | 1/2009 | Blume | B62H 3/00 211/20 |
| 7,481,027 | B2 * | 1/2009 | Blume | B62H 3/04 211/17 |
| 7,694,830 | B1 * | 4/2010 | Larson | B62H 3/08 211/20 |
| 7,946,432 | B1 * | 5/2011 | Swanson | B62H 3/12 211/20 |
| D689,011 | S * | 9/2013 | Isakov | B62H 3/12 D12/402 |
| D691,522 | S * | 10/2013 | Koepke | D12/115 |
| 8,950,592 | B1 * | 2/2015 | Greenblatt | B62H 3/12 211/17 |
| 9,004,296 | B2 * | 4/2015 | Huntington | B62H 3/00 211/22 |
| 9,199,681 | B2 * | 12/2015 | Gonzalez Hernandez | B62H 3/08 |
| 9,278,721 | B2 * | 3/2016 | Blume | B62H 3/04 |
| D768,545 | S * | 10/2016 | Greenblatt | D12/115 |
| 9,776,790 | B2 * | 10/2017 | Kwon | B65G 1/04 |
| 2004/0129656 | A1 * | 7/2004 | Garcia Simon | B62H 3/04 211/22 |
| 2005/0284036 | A1 * | 12/2005 | Blume | B62H 3/00 52/79.4 |
| 2007/0107322 | A1 * | 5/2007 | Blume | B62H 3/04 52/79.4 |
| 2015/0008197 | A1 * | 1/2015 | Blume | B62H 3/08 211/20 |
| 2015/0102714 | A1 * | 4/2015 | Gonzalez Hernandez | B62H 3/08 312/237 |
| 2018/0080241 | A1 * | 3/2018 | Greenblatt | E04H 6/005 |

FOREIGN PATENT DOCUMENTS

| | | | | |
|---|---|---|---|---|
| JP | 2003155833 A | * | 5/2003 | |
| KR | 10-2011-0019005 | | 2/2011 | |
| KR | 20110019005 A | * | 2/2011 | B62H 3/08 |
| KR | 10-2011-0073078 | | 6/2011 | |
| KR | 20110073078 A | * | 6/2011 | |

* cited by examiner

MODULAR CYCLE STORAGE APPARATUS

TECHNICAL FIELD

The present invention relates to cycle storage rack or apparatus and in particular to a modular cycle storage apparatus allowing storage of multiple cycles in a space efficient manner.

BACKGROUND ART

Cycle storage apparatus allowing storage of multiple cycles in a spacious efficient manner are commercially available. The most common form of this type of storage rack are bicycle storage racks.

There are many different types of bicycle storage racks varying from storage racks which are attached to a substantially vertical wall surface and which are adapted to receive one or more bicycles substantially parallel to the wall. Generally these bicycle storage racks hold the frame of the bike or alternatively, the handlebars and saddle.

Another main type of bicycle storage rack is attached to a substantially vertical wall surface but is adapted to receive one or more bicycles substantially perpendicularly to the wall. Generally these storage racks engage one or more of the wheels or tyres of the bicycle and the bicycle essentially extends perpendicularly into the room.

The dominant problem with cycle storage apparatus is how to store multiple cycles in a space efficient manner. One mechanism is to store one bicycle directly above another. One such system is sold under the trade mark Josta®.

In this system, an upper rack and a lower rack are provided on a substantially L-shaped support. The upper rack is extendable and pivotable relative to a substantially horizontal support spaced above the ground surface. A user is able to load their bicycle onto an upper rack of this particular system by pulling the upper rack down, lifting the front wheel of the bicycle onto the lower rack in pushing the bicycle forwards, locking the bicycle in position and then lifting the rack back into a substantially horizontal position above the ground surface. In order to unlearn the bicycle from the upper rack, the process is reversed.

The system, whilst effective, quite frankly, lacks visual appeal. Further, the Josta system is based around a central channel that holds the bicycle. This channel is claimed to be very easily lifted up and pushed into place. However, there can be a high degree of precision required in order to load and unload a pike using this system, with the central channel that holds the bicycle easily being misaligned when lifting and lowering resulting in a system which is difficult to use and also one which requires the user to do a majority of the weight-bearing movement when loading and unloading the bicycle.

It will be clearly understood that, if a prior art publication is referred to herein, this reference does not constitute an admission that the publication forms part of the common general knowledge in the art in Australia or in any other country.

SUMMARY OF INVENTION

The present invention is directed to a modular cycle storage apparatus, which may at least partially overcome at least one of the abovementioned disadvantages or provide the consumer with a useful or commercial choice.

With the foregoing in view, the present invention in one form, resides broadly in a modular cycle storage apparatus including at least one at least partially arcuate fixed trunk assembly extending upwardly from the mounting surface, at least one arcuate movable arm assembly mounted relative to the at least one fixed trunk assembly and movable relative thereto between an extended, lower position and a retracted, elevated position, and at least one lower arm assembly mounted relative to a lower portion of the at least one fixed trunk assembly and beneath the at least one arcuate movable arm assembly, each of the at least one arcuate movable arm assembly and the at least one lower arm assembly adapted to mount a cycle for at least temporary storage.

The modular cycle storage apparatus of the present invention is particularly directed towards a two tier bicycle storage rack. The apparatus can easily be adapted to providing more than two tiers, but this will use increased volume due to the arcuate shape of the apparatus.

The apparatus of the present invention will primarily be of metal construction although other, similarly robust and strong materials could be used. Components of the apparatus of the present invention may be non-metal, and in some cases, non-metal components will be preferred.

Typically, more than one modular cycle storage apparatus will be used together. Typically, each is mounted relative to a surface adjacent to one or more other apparatus. Normally, adjacent apparatus are spaced apart. It is particularly preferred that where multiple apparatus are used together, that the apparatus be provided at different heights. In particular, it is preferred that the storage apparatus of the present invention be available with the fixed trunk being of different heights. Preferably, even though different height fixed trunks may be provided, the preferred radius of the arcuate portion of the fix trunk assembly (and the moveable arm assembly) will be the same.

According to a particular the preferred embodiment, the fixed trunk may be available in two heights and particularly, the height of the end of the arcuate portion will normally be available in two different heights from the mounting surface. The height of the arcuate portion is preferably adjusted by providing a substantially upright portion below the arcuate portion of the fixed arm assembly and the height of this upright portion can be adjusted to adjust the height of the arcuate portion from the mounting surface. The provision of different height fixed trunks will preferably allow a number of apparatus to be used in a group, with the different height fixed trunks being alternated in order to offset the height of the movable arm of one apparatus from that of the movable arm of an adjacent apparatus. This has a further result that the lateral separation between adjacent apparatus of the present invention can be reduced as the handlebars and pedals of the cycles in adjacent storage apparatus will not be at the same height.

The modular cycle storage apparatus of the present invention includes at least one, at least partially arcuate fixed trunk assembly extending upwardly from the mounting surface. The fixed trunk assembly is normally fixed, typically permanently, to a mounting surface. Normally, the mounting surface will be a ground or floor surface, and normally, will be concrete or similar with a substantially flat or planar upper surface. The fixed trunk assembly is normally fixed to the mounting surface at a lower end, normally through the provision of one or more laterally extending flanges through which one or more appropriate fixtures can be provided.

As mentioned above, the fixed trunk assembly will normally extend upwardly from the mounting surface. Other components of the apparatus are typically attached to, or relative to the fixed trunk.

The fixed trunk assembly will normally be formed having a pair of sidewalls. Each side wall is typically substantially planar. Preferably, the sidewalls are substantially parallel to one another. The sidewalls are typically shaped. The shape of the sidewalls will typically define an at least partially arcuate shape. Depending upon whether the fixed trunk assembly is of a first type or a second type, the sidewalls may have a substantially upright portion in order to space the arcuate portion from the mounting surface.

The fixed trunk assembly will also normally have a pair of transversely extending infill sections located between the pair of sidewalls. The infill sections will typically space the sidewalls apart. Normally, there is one upper infill section and one lower infill section. Both infill sections are preferably substantially rectangular in shape when viewed from above although will be arcuate when viewed from the side. Typically, the infill sections are attached to the sidewalls, preferably perpendicularly.

Where provided in the preferred configuration, the infill sections and the pair of sidewalls will combine to define a substantially rectangular volume within the fixed trunk assembly in order to receive, and preferably guide the movement of at least a portion of the movable arm assembly.

It is also preferred that the lower infill section be substantially continuous. Normally, the lower infill section will be substantially the same length as sidewalls provided in the trunk assembly. The upper infill section will typically have a solid lower or rearward portion and will be divided toward the forward end of the upper infill section. In particular, a longitudinally extending slot opening will normally be provided from the outer or forward end of the upper infill section extending rearwardly, partially along the length of the upper infill section. This will typically have the effect of forming a pair of strip portions on either side of the slot opening. The strip portions will typically be attached to the sidewalls of the trunk assembly. The strip portions will normally provide an abutment surface for rollers provided on the movable arm assembly whilst the slot opening allows clamping portions, particularly an upper clamp portion, to be received therein. This configuration will be explained further below.

An outer or free end of the trunk assembly will preferably have a least one roller provided. Preferably, the least one roller will be provided on a lower side of the outer end. The provision of the roller will allow the weight of the movable arm assembly to be spread more evenly to reduce load. Preferably, one roller assembly including a pair of rollers is provided. Each of the pair of rollers is preferably stepped having a taller outer portion and a lower inner portion in order to receive an underside of the movable arm assembly in the inner portion and the taller outer portions abut the sidewalls of the movable arm in order to guide extension and retraction, but will limit lateral movement of the movable arm assembly particularly when the bearings on the movable arm assembly abut the inner surface of the box volume. It is preferred that the rollers are provided of low friction material and a material such as nylon or similar is preferred for strength and also friction advantages.

One or more stop mechanisms are preferably provided in relation to the trunk assembly in order that the preferred bearings provided on the movable arm assembly abut one or more of the stop mechanisms in order to stop movement of the movable arm assembly at one or more design positions. Typically, a stop mechanism is provided to stop movement of the movable arm in a retracted position and a stop mechanism is provided to stop movement of the movable arm in the extended position. The configuration of these stop mechanisms can, and generally will be different. The stop mechanisms may be movable in order to allow an operator to assemble the apparatus and position to stop mechanisms as required, particularly depending upon whether the trunk assembly is a "short" trunk or a "tall" trunk.

The modular cycle storage apparatus of the present invention also includes at least one arcuate movable arm assembly mounted relative to the at least one fixed trunk assembly and movable relative thereto between an extended, a lower position and a retracted, elevated position. The configuration of the movable arm assembly is preferably the same for both possible configurations of the fixed trunk assembly. In this way, a single movable arm assembly can be manufactured and be fitted to either a "short" trunk or a "tall" trunk.

In particular, it is preferred that the movable arm assembly be arcuate in that the arc of the movable arm assembly correspond to that of the arcuate portion of the fixed trunk assembly.

The movable arm assembly will preferably be formed about an arcuate spine member or spine assembly. Preferably, a substantially unitary spine member is provided. The spine member or spine assembly will typically be arcuate. It is particularly preferred that the arcuate spine member or assembly will be dimensioned in order to be received within the substantially rectangular box volume provided within the trunk assembly. The arcuate spine will typically be the main load-bearing member or assembly of the movable arm assembly. It is particularly preferred that the spine member or assembly will be box or rectangular shaped.

One or more bearing carriages are preferably fixed to the spine member or assembly. Typically more than one bearing carriages provided, and normally to bearing carriages are provided. Preferably, a bearing carriage is provided at a lower or in the end of the arcuate spine member or assembly. A second bearing carriage is preferably provided spaced from the first bearing carriage, typically approximately 500 mm from the first bearing carriage. The bearing carriages will normally be closely received within the substantially rectangular box volume provided within the trunk assembly to limit any lateral movement of the spine member or assembly.

Each bearing carriage typically has at least one, and preferably a pair of bearings on each lateral side of the bearing carriage. Typically, one bearing is set towards an upper side of the spine member or assembly and one bearing is provided towards the lower side of the spine member or assembly. Typically, bearings will be provided in pairs, one bearing of each pair on either lateral side of each bearing set. Normally, the bearings will abut the upper and lower infill sections provided on the trunk assembly, in order to guide the movement of the movable arm assembly relative thereto.

The bearing sets are preferably mounted relative to the spine member, typically directly to the spine member, using one or more brackets and fasteners. According to a particularly preferred embodiment, the bearing sets are clamped to the spine member or assembly.

A pair of arcuate sidewalls are preferably provided relative to the arcuate spine member or assembly. Each of the arcuate sidewalls is preferably fixed to the spine member, preferably directly. Each of the arcuate sidewalls will preferably stand proud of the spine member or assembly above the level of the spine member or assembly, on both sides of the spine member or assembly in order to define a channel which operates as a wheel guide or track.

The pair of arcuate sidewalls or a portion thereof also preferably forms an outer wheel catcher or clamp assembly. Further, the pair of arcuate sidewalls may provide mounting points for mounting the inner wheel catcher or clamp assembly relative to the spine member or assembly.

According to a most preferred embodiment, each of the arcuate sidewalls has an annodated or sigmoid shape (shaped like an upper case S). Preferably, the portion of each arcuate sidewall located furthest away from the trunk assembly is preferably upwardly extending.

A handle or similar grasping portion is typically attached to the movable arm and preferably, to the arcuate sidewalls at an outer end thereof. Preferably, the handle or grasping portion is substantially U-shaped. The preferred handle will also preferably mount a guide roller or similar in order to receive a wheel of a cycle thereon and guide the wheel into the channel defined between the arcuate sidewalls. The guide roller will normally also assist with maintaining the arcuate sidewalls in a spaced apart configuration, as well as being an abutment member to abut the cycle wheel when in the stored condition, to hold the cycle on the moveable arm assembly.

The preferred handle is typically arcuate, but with the arc oriented in an opposite direction to the arc of the sidewalls. The bolts or fasteners used to attach the handle to the movable arm also preferably mount the preferred guide roller and appropriate spacers to maintain the arcuate sidewalls are spaced apart. Together, the ends of the arcuate sidewalls, the guide portion and the spacers will normally define an outer wheel catcher or clamp assembly which is fixed in position and orientation.

The inner wheel catcher or clamp assembly is preferably provided at or towards an opposite end of the movable arm assembly to the outer wheel catcher or clamp assembly. Preferably, the inner wheel catcher or clamp assembly is mounted relative to the movable arm in order to allow cycles of different lengths or dimensions to be accommodated between the inner wheel catcher or clamp assembly and the outer wheel catcher or clamp assembly. Typically, the inner wheel catcher or clamp assembly will pivot away from the outer wheel catcher or clamp assembly about a lower pivot point.

Preferably, the inner wheel catcher or clamp assembly is biased towards the outer wheel catcher or clamp assembly. Any mechanism can be used to bias the inner wheel catcher or clamp assembly. According to the most preferred embodiment, a pair of gas struts or rams, one located on either lateral side of the inner wheel catcher or clamp assembly are provided. The provision of the preferred gas struts or rams, and the biased nature of the inner wheel catcher or clamp assembly will preferably force the cycle, once loaded, into the outer wheel catcher or clamp assembly thereby clamping the cycle between the respective wheel catches or clamp assemblies to hold the cycle.

The inner wheel catcher or clamp assembly is typically formed from a pair of spaced apart members, upstanding from the spine member or assembly. Preferably, the spaced apart members are attached to the spine member or assembly, preferably between the arcuate sidewalls and the spine member or assembly.

An upper end of the pair of spaced apart members is normally provided with a stop or guide, and preferably, the stop or guide is provided as a roller. Normally the roller will be U-shaped in cross-section. The preferred stop or guide is mounted such that for most, and preferably all cycles which are placed in the storage apparatus of the present invention, the stop or guide will preferably be located above the midline of the wheel of the bike thereby preventing the bike from leaving the channel in the spine member or assembly unless forced to. Preferably, the stop or guide will be formed from a robust material and as with the other bearings and guides provided, a nylon material is preferred.

A pivoting arm, used mainly for locking the cycle relative to the storage apparatus is preferably provided relative to the movable arm assembly. Normally, a lower portion of the pivoting arm is attached directly to one of the sidewalls and/or the spine member or assembly and is movable relative thereto between a storage condition and a use condition. Preferably, the pivoting arm will have at least one opening therethrough allowing a cycle lock to be attached through the opening and about a portion of the cycle. Preferably, the pivoting arm is deployed and positioned as required and then the cycle lock is placed through the opening. In the storage condition, the pivoting arm is normally lowered against the spine member or assembly.

The modular cycle storage apparatus of the present invention also includes at least one lower arm assembly mounted relative to a lower portion of the at least one fixed trunk assembly and beneath the at least one movable arm assembly. Preferably, the configuration of the lower arm assembly will be substantially the same for each of the trunk configurations, whether "short" or "tall".

The lower arm assembly preferably includes a main rail with a substantially U-shaped cross-section. Preferably, the main rail includes a channel which receives and guides the wheel during loading and unloading.

A pair of upright portions are typically attached, one to either side of one end of the main rail and upstanding therefrom. The upright portions of the lower arm assembly are typically fixed to the upstanding portions of the U channel of the main rail and to the trunk assembly. Preferably, the pair of upright portions are spaced apart in order to receive a wheel of the cycle therebetween. Normally, one or more spacers are used to space the upright portions apart. Preferably, a stop or guide member is provided at an upper end of the upright portions and between them.

One or more ramp members are preferably located in the channel of the main rail and the wheel of the cycle is forced over the ramp members during loading and unloading. Preferably, the ramp members have a pair of portions which are angled toward one another to form a peak. This will allow the ramp to operate in both directions to allow the wheel to pass if forced but to prevent accidental dislodgement. Typically, the ramp member is spaced from the upright portions. As with the movable arm assembly, the lower arm assembly is preferably provided with a pivoting arm to be used as a locking member.

Preferably, the main rail of the lower arm assembly can be located spaced from the mounting surface and substantially parallel thereto when the lower arm assembly is provided for the "tall" trunk assembly. In this case, an entry ramp is normally provided at an outer end of the main rail. The entry ramp typically has a pair of side members and one or more crossmembers linking the side members in order to provide a ladder-like configuration to the entry ramp. Normally, the entry ramp is angled outwardly from the end of the main rail and functions to support the outer end of the main rail above the ground surface.

As mentioned above, the movable arm assembly preferably has the same radius has the fixed trunk assembly. The outer end of the movable arm assembly can be drawn outwardly and due to the radius, will also swing the arm assembly downwardly until an outer end is adjacent the ground allowing the cycle to be loaded and unloaded. The provision of the bearing carriages on the arcuate spine member or assembly of the movable arm assembly allows a user to move the movable arm assembly more easily and smoothly than prior art devices. This reduces the force required in order to move the movable arm assembly between the extended and retracted conditions and also reduces the amount of force that must be applied to lift the movable arm assembly into the elevated storage condition.

In an alternative aspect, the present invention resides in a modular cycle storage system including a plurality of modular cycle storage apparatus as explained above with some of the apparatus being provided with a fixed trunk assembly of a first type and some of the apparatus provided with a fixed trunk assembly of a second type which is taller than the first type resulting in the arcuate portion of the respective trunk assembly as being a different heights. In use, the storage system of this embodiment will provide the fixed trunk assemblies of the first type alternating with fixed trunk assemblies of the second type in order to compact the apparatus into the smallest possible space.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a modular cycle storage apparatus is provided.

Figure 1:
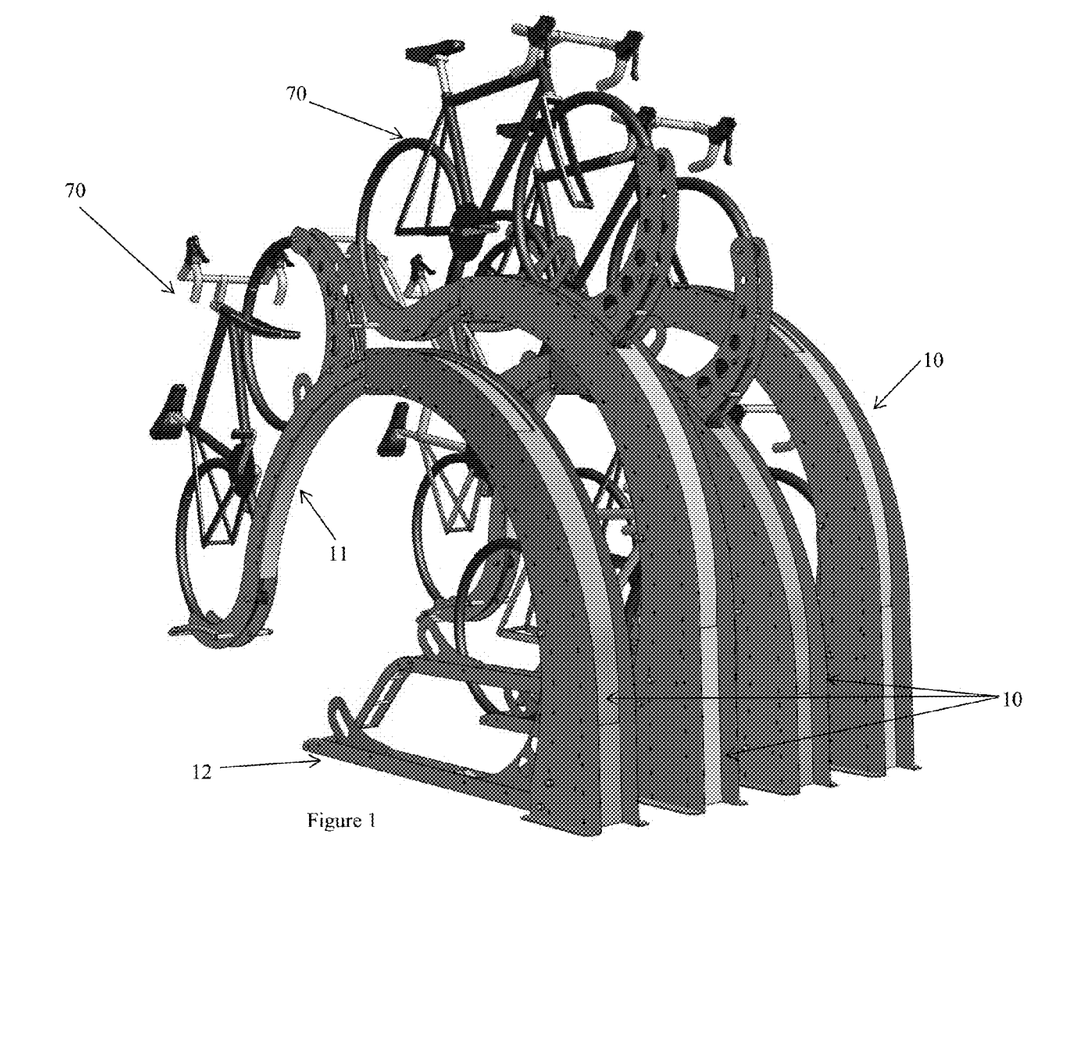
FIG. 1 is an isometric view of a modular cycle storage system according to a preferred embodiment of the present invention.
Figure 2:
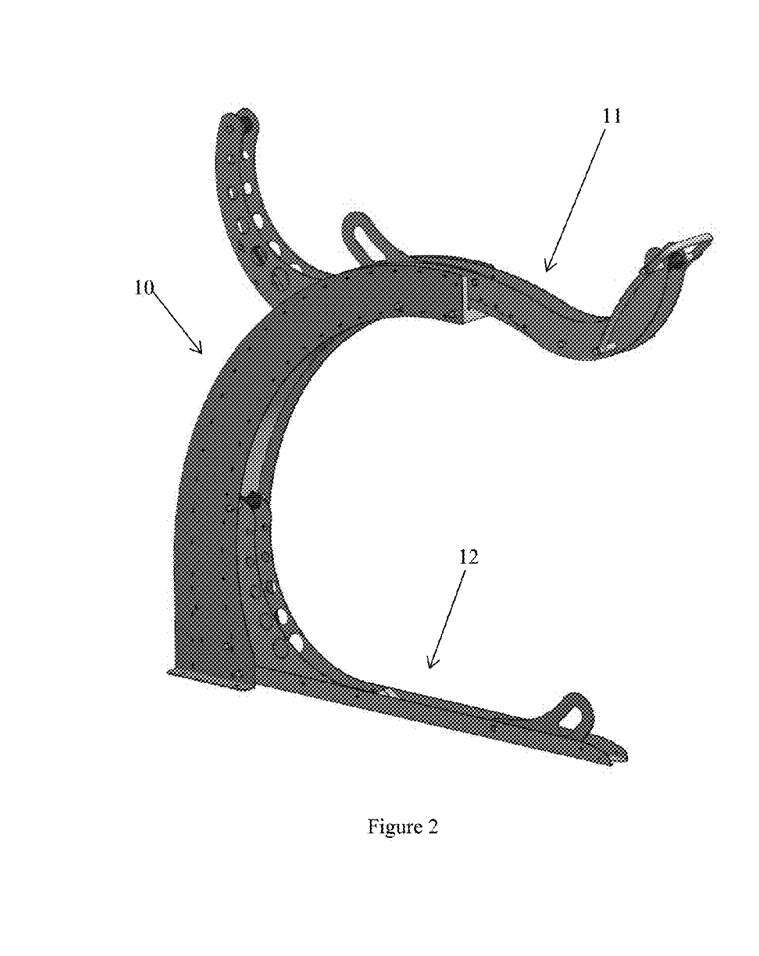
FIG. 2 is an isometric view of a modular cycle storage apparatus according to a first preferred configuration.
Figure 3:
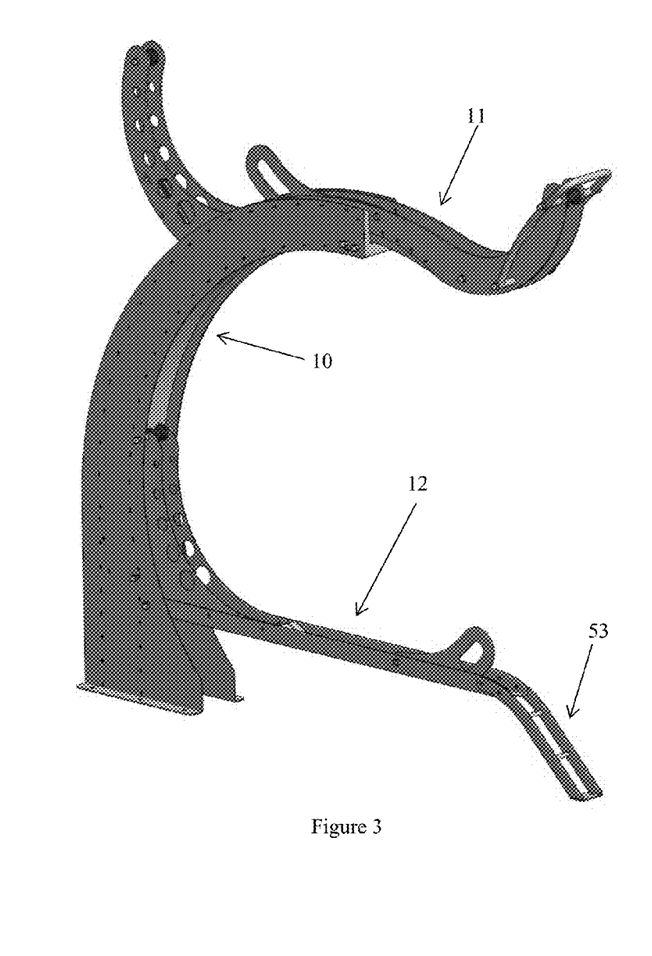
FIG. 3 is an isometric view of a modular cycle storage apparatus according to a second preferred configuration.
Figure 4:
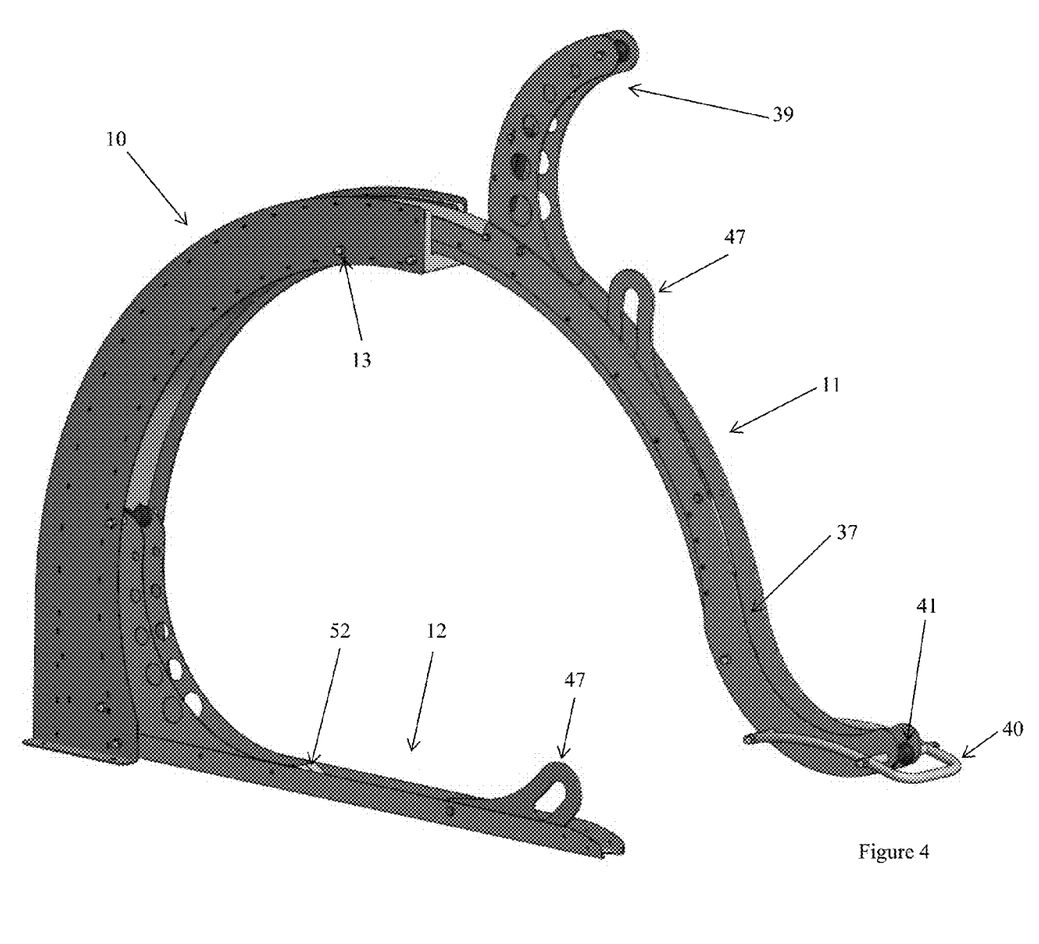
FIG. 4 is an isometric view of the configuration illustrated in FIG. 2 with the upper storage assembly in the loading and unloading position.
Figure 5:
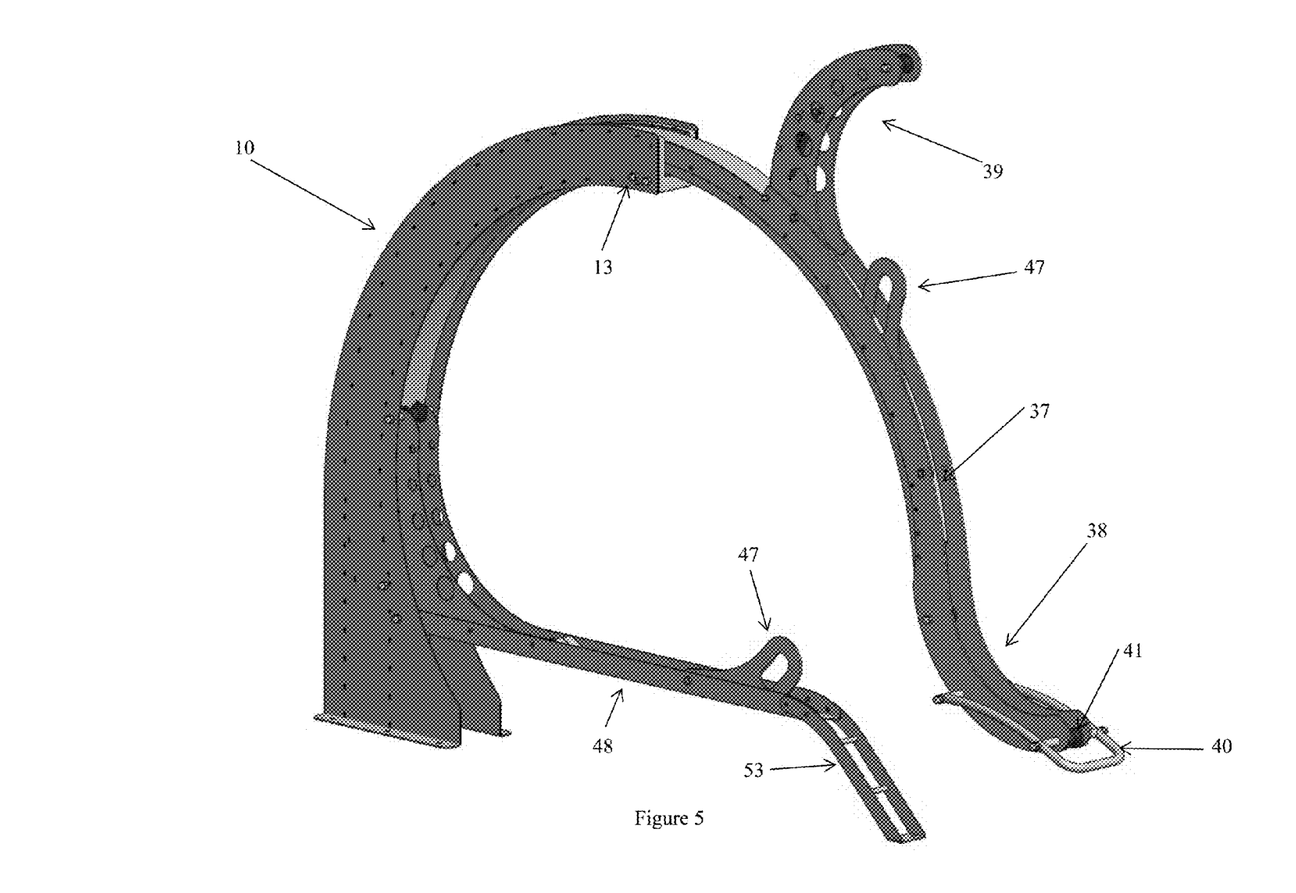
FIG. 5 is an isometric view of the configuration illustrated in FIG. 3 with the upper storage assembly in the loading and unloading position.

The modular cycle storage apparatus of the preferred embodiments include an at least partially arcuate fixed trunk assembly 10 extending upwardly from a mounting surface, an arcuate movable arm assembly 11 mounted relative to the fixed trunk assembly 10 and movable relative thereto between an extended, lower position as illustrated in FIGS. 4 and 5 and a retracted, elevated position as illustrated in FIGS. 2 and 3. A lower arm assembly 12 is also provided mounted relative to a lower portion of the fixed trunk assembly 10 and beneath the movable arm assembly 11, each of the movable arm assembly 11 and the lower arm assembly 12 adapted to mount a bicycle 70 for at least temporary storage as illustrated in FIG. 1.

The modular cycle storage apparatus of the present invention is particularly directed towards a two tier bicycle storage rack as illustrated in FIG. 1. Normally, a number of apparatus are provided in an area allowing multiple bicycles 70 to be stored in a small area.

Typically, more than one modular cycle storage apparatus will be used together as illustrated in FIG. 1. Typically, each is mounted relative to a surface adjacent to one or more other apparatus. Normally, adjacent apparatus are spaced apart. It is particularly preferred that where multiple apparatus are used together, the apparatus be provided at different heights. In particular, it is preferred that the storage apparatus of the present invention be available with the fixed trunk 10 being of different heights. Preferably, even though different height fixed trunks 10 may be provided, the preferred radius of the arcuate portion will be the same.

According to a particular the preferred embodiment, the fixed trunk may be available in two heights and particularly, the height of the end of the arcuate portion will normally be available in two heights from the mounting surface. The two different heights are illustrated in FIG. 2 (short trunk) and FIG. 3 (tall trunk). The height of the arcuate portion is preferably adjusted by providing a substantially upright portion below the arcuate portion and the height of this upright portion can be adjusted to adjust the height of the arcuate portion from the mounting surface. The provision of different height fixed trunks will preferably allow a number of apparatus to be used in a group with the different height fixed trunks being alternated in order to offset the height of the movable arm of one apparatus to that of the movable arm of an adjacent apparatus as illustrated in FIG. 1. This has a further result that the lateral separation between adjacent apparatus of the present invention can be reduced as the handlebars and pedals of the bicycles 70 in adjacent storage apparatus are not at the same height.

It can also be seen that the distance between the end of the movable arm assembly 11 of the short trunk configuration illustrated in FIG. 4, is basically the same as that for the tall trunk version illustrated in FIG. 5 due to the stop 13 on the trunk 10 being moved to increase the travel of the movable arm assembly in the tall trunk version.

The fixed trunk assembly 10 of the preferred embodiment is normally fixed, typically permanently, to a mounting surface. Normally, the mounting surface will normally be a concrete slab or similar with a substantially flat or planar upper surface. The fixed trunk assembly 10 is normally fixed to the mounting surface at a lower end, normally through the provision of one or more laterally extending flanges 14 through which an appropriate fixture such as an expanding bolt can be provided.

Figure 6:
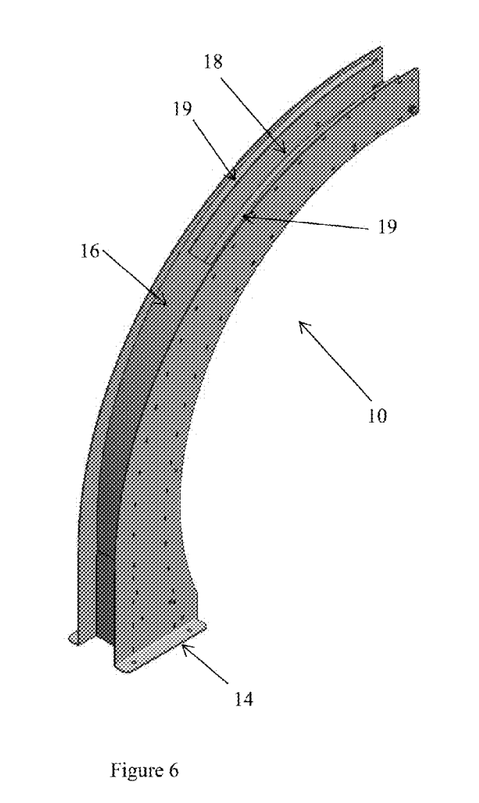
FIG. 6 is an isometric view of a fixed arm assembly according to an embodiment of the present invention.
Figures 7, 8:
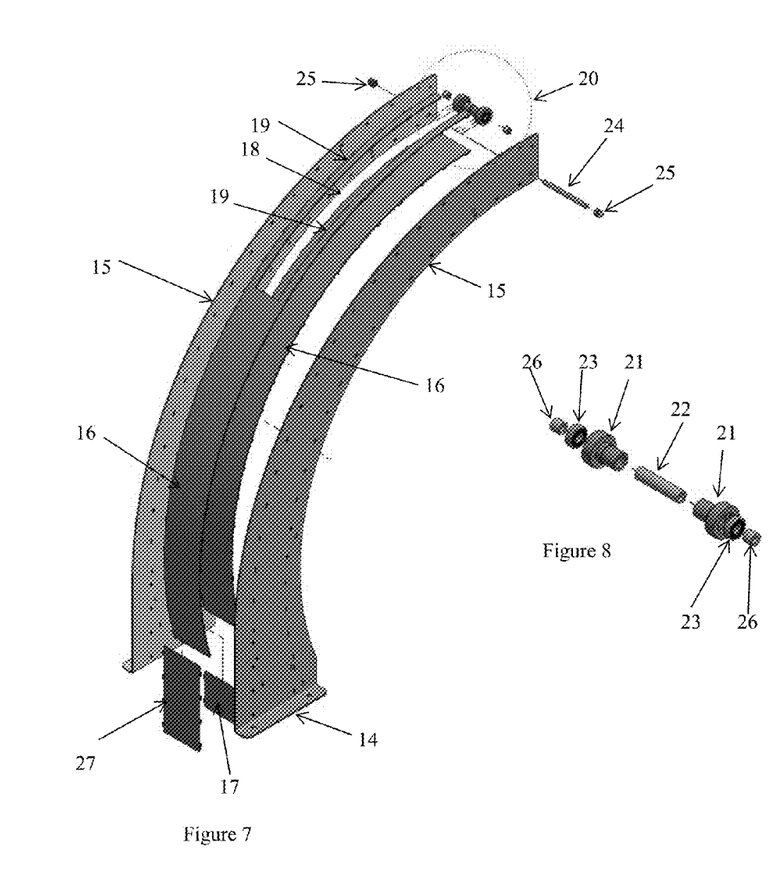
FIG. 7 is an exploded view of the fixed arm assembly illustrated in FIG. 6.
FIG. 8 is an exploded view of the portion identified as Detail A in FIG. 7.

A preferred fixed trunk assembly 10 is illustrated in FIGS. 6 to 8 in detail. These Figures show a short trunk but a tall trunk has basically the same set of features with an increased height and a larger footprint (illustrated in FIGS. 3 and 5) to provide a stable mounting.

The illustrated fixed trunk 10 is formed having a pair of sidewalls 15. Each side wall 15 is substantially planar and substantially parallel to one another. The sidewalls 15 are at least partially arcuate shaped.

The fixed trunk assembly 10 also has a pair of transversely extending infill sections 16 located between the pair of sidewalls 15 to space the sidewalls 15 apart. Both infill sections 16 are substantially rectangular in shape when viewed from above although they are arcuate when viewed from the side. Typically, the infill sections are attached to the sidewalls, normally by welding or similar.

Where provided in the preferred configuration, the infill sections 16 and the pair of sidewalls 15 combine to define a substantially rectangular volume within the fixed trunk assembly 10 in order to receive and guide the movement of at least a portion of the movable arm assembly 11.

As illustrated in FIG. 7 in particular, the lower infill section is substantially continuous. Normally, the lower infill section is substantially the same length as the sidewalls provided in the trunk assembly although a cover member 17 is provided at a lower front side of the trunk 10. A rear cover member 27 is also provided.

As illustrated in FIGS. 6 and 7, the upper infill section has a solid lower or rearward portion and is divided toward the forward end of the upper infill section 16. A longitudinally extending slot opening 18 is provided from the outer or forward end of the upper infill section 16 extending rearwardly, partially along the length of the upper infill section 16. This forms a pair of strip portions 19 on either side of the slot opening 18. The strip portions 19 are attached to the sidewalls 15 of the trunk assembly 10 and provide an abutment surface for rollers provided on the movable arm assembly 11 whilst the slot opening 18 allows the wheel clamping portions, particularly the upper wheel clamping portion to be received therein. This configuration is explained further below.

As illustrated in FIGS. 7 and 8, the outer or free end of the trunk assembly 10 has a roller guide assembly 20 (FIG. 8) provided on a lower side of the outer end. The provision of the roller guide assembly allows the weight of the movable arm assembly 11 to be spread more evenly so as to reduce the amount of force a user must apply to move the movable arm assembly 11. As illustrated, the roller guide assembly includes a pair of rollers 21. Each of the pair of rollers 21 is stepped having a taller outer portion and a lower inner portion in order to receive an underside of the spine of the movable arm assembly 11 in the inner portion and the taller outer portion abuts the sides of the spine of the movable arm in order to guide extension and retraction, and limit lateral movement of the movable arm assembly 11. It is preferred that the rollers are provided of low friction material and a material such as nylon or similar is preferred for strength and also friction advantages. The rollers 21 are mounted on a central carrier 22 and a bearing 23 is provided for each roller 21 to allow rotation of the rollers 21. The roller assembly is mounted using a bolt 24 with nuts 25 on either end. A spacer 26 is provided on either end to maintain the rollers 21 centrally.

As mentioned above, stop mechanisms 13 are provided in relation to the trunk assembly 10 in order that the preferred bearings provided on the movable arm assembly 11 abut the stop mechanisms 13 in order to stop movement of the movable arm assembly 11 at one or more positions. Typically, a stop mechanism is provided to stop movement of the movable arm 11 in a retracted position. This stop mechanism can simply be the end of the slot opening 18 abutting a portion of the moveable arm assembly 11. The stop mechanism 13 provided to stop movement of the movable arm 11 in the extended position is preferably movable in order to allow an operator to assemble the apparatus and position to stop mechanisms 13 as required, particularly depending upon whether the trunk assembly is a "short" trunk (FIG. 4) or a "tall" trunk (FIG. 5).

The configuration of the movable arm assembly 11 is preferably the same for both possible configurations of the fixed trunk assembly 10. In this way, a single movable arm assembly 11 can be manufactured and be fitted to either a "short" trunk (FIG. 4) or a "tall" trunk (FIG. 5).

It is particularly preferred that the movable arm assembly 11 be arcuate in that the arc of the movable arm assembly 11 correspond to that of the arcuate portion of the fixed trunk assembly 10.

Figures 9, 10, 11:
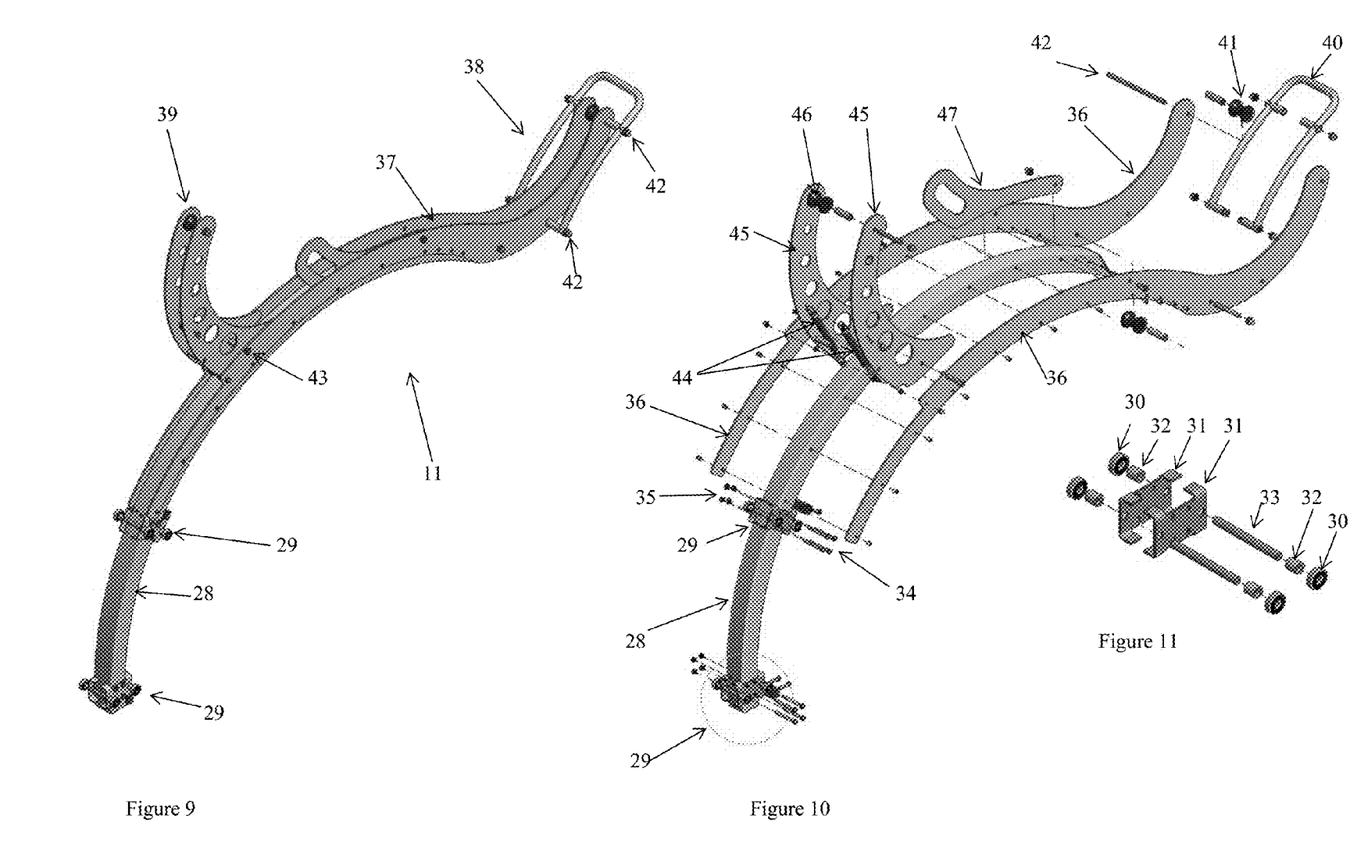
FIG. 9 is an isometric view of a movable arm assembly according to an embodiment of the present invention.
FIG. 10 is an exploded view of the movable arm assembly illustrated in FIG. 9.
FIG. 11 is an exploded view of the portion identified as Detail B in FIG. 9.
Figure 12:
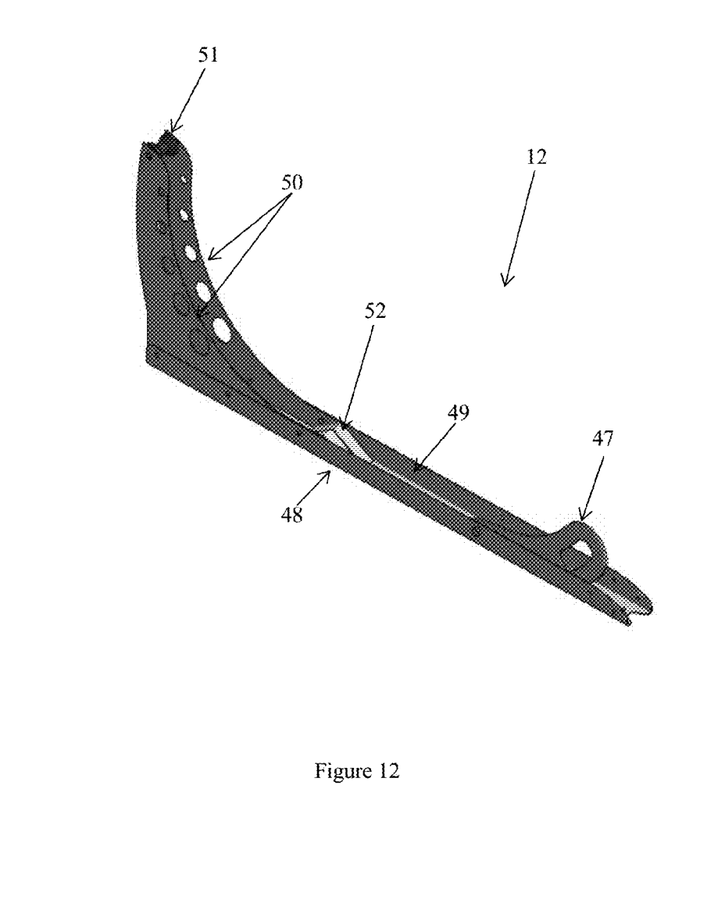
FIG. 12 is an isometric view of a lower arm assembly according to an embodiment of the present invention.
Figure 13:
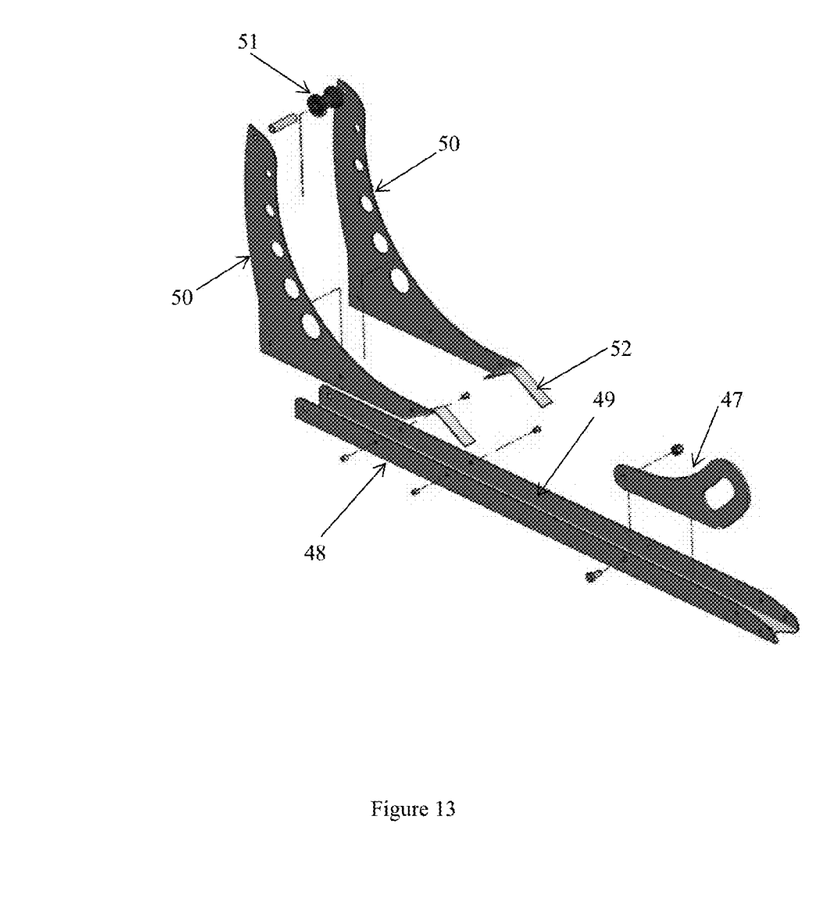
FIG. 13 is an isometric view of the lower arm assembly illustrated in FIG. 12.

As illustrated in FIGS. 9 to 11, the movable arm assembly 11 is preferably formed about an arcuate spine member 28 which is substantially unitary. It is particularly preferred that the arcuate spine member 28 is dimensioned in order to be received within the substantially rectangular box volume provided within the trunk assembly 10. The arcuate spine member is the main load-bearing member of the movable arm assembly 11. As illustrated, the spine member 28 is box or rectangular shaped.

A pair of bearing carriages 29 are fixed to the spine member 28 in the embodiment illustrated in FIGS. 9 and 10, with a bearing carriage 29 provided at a lower end of the arcuate spine member 28 and a second bearing carriage 29 provided spaced from the first bearing carriage 29, typically approximately 500 mm from the first bearing carriage 29.

As illustrated in detail in FIG. 11, each bearing carriage 29 has a pair of bearings 30 on each lateral side of the bearing carriage 29. Typically, one bearing 30 is located above an upper side of the spine member 28 and one bearing 29 is located below the lower side of the spine member 28. The bearings 30 are provided in pairs, one bearing 30 of each pair on either lateral side of each bearing set. Normally, the bearings 30 will abut the upper and lower infill sections 16 provided on the trunk assembly 10, in order to guide the movement of the movable arm assembly 11 relative thereto.

The bearings 30 are mounted directly to the spine member 28, using a pair of brackets 31, a carrier 33 to mount the bearings 30, a spacer 32 between the bracket 31 and the bearing 30 and an elongate fastener 34 with nuts 35 to clamp the bearing sets to the spine member 28.

A pair of arcuate sidewalls 36 are provided relative to the arcuate spine member 28. Each of the arcuate sidewalls 36 is fixed to the spine member 28. The arcuate sidewalls 36 stand proud of the spine member 28 above the level of the spine member 28, on both sides of the spine member 28 in order to define a channel 37 which operates as a wheel guide or track.

The sidewalls 36 also preferably form an outer wheel catcher or clamp assembly 38 and provide mounting points for mounting the inner wheel catcher or clamp assembly 39 relative to the spine member 28.

According to the embodiment illustrated in FIGS. 9 and 10, each of the arcuate sidewalls has an annodated or sigmoid shape (shaped like an upper case S). Preferably, the portion of each arcuate sidewall 36 located furthest away from the trunk assembly is preferably upwardly extending. This portion preferably forms the outer wheel catcher or clamp assembly 38.

A handle 40 is typically attached to the movable arm at an outer end thereof. As illustrated, the handle 40 is substantially U-shaped. The handle 40 also mounts a guide roller 41 in order to receive a wheel of a bicycle 70 thereon and guide the wheel into the channel 37 defined between the arcuate sidewalls 36. The guide roller 41 will normally also assist with maintaining the arcuate sidewalls 36 in a spaced apart configuration, as well as being an abutment member to abut the cycle wheel when in the stored condition.

The handle 40 is arcuate, but oriented such that the arc of the handle is in an opposite direction to the arc of the sidewalls 36. The bolts or fasteners 42 used to attach the handle 40 to the movable arm 11 also preferably mount the guide roller 41 and appropriate spacers to maintain the arcuate sidewalls 36 spaced apart. Together, the ends of the arcuate sidewalls 36, the guide roller 41 and the spacers will define an outer wheel catcher or clamp assembly 38 which is fixed in position and orientation.

The inner wheel catcher or clamp assembly 39 is provided at or towards an opposite end of the movable arm assembly 11 to the outer wheel catcher or clamp assembly 38. The inner wheel catcher or clamp assembly 39 is mounted relative to the movable arm 11 in order to allow cycles of different lengths or dimensions to be accommodated between the inner wheel catcher or clamp assembly 30 and the outer wheel catcher or clamp assembly 38. Typically, the inner wheel catcher or clamp assembly 39 will pivot away from the outer wheel catcher or clamp assembly 38 about a lower pivot point 43.

The inner wheel catcher or clamp assembly 39 of the illustrated embodiment is biased towards the outer wheel catcher or clamp assembly 38 using a pair of gas struts 44, one located on either lateral side of the inner wheel catcher or clamp assembly 39. The provision of the preferred gas struts 44, and the biased nature of the inner wheel catcher or clamp assembly 39 will preferably force the bicycle 70, once loaded, into the outer wheel catcher or clamp assembly 38 thereby clamping the bicycle 70 between the respective wheel catchers or clamp assemblies to hold the cycle.

As illustrated, the inner wheel catcher or clamp assembly 39 is formed from a pair of spaced apart members 45, upstanding from the spine member 28. The spaced apart members 45 are attached to the spine member 28, preferably between the arcuate sidewalls 36 and the spine member 28 about the pivot 43.

An upper end of the pair of spaced apart members 45 is provided with a roller stop or guide 46. Normally the roller stop or guide 46 is U-shaped in cross-section. The roller stop or guide 46 is mounted such that for most bicycles which are placed in the storage apparatus of the present invention, the roller stop or guide 46 is located above the midline of the wheel of the bike thereby preventing the bike from leaving the channel 37 in the spine member 28 unless forced to. Preferably, the roller stop or guide 46 is formed from a robust material and as with the other bearings and guides provided, a nylon material is preferred.

A pivoting arm 47, used mainly for locking the bicycle 70 relative to the storage apparatus is provided relative to the movable arm assembly 11. Normally, a lower end of the pivoting arm 47 is attached directly to one of the sidewalls 36 and/or the spine member 28 and is movable relative thereto between a storage condition and a use condition. Preferably, the pivoting arm 47 will have an opening therethrough allowing a cycle lock to be attached through the opening and about a portion of the cycle. Preferably, the pivoting arm 47 is deployed and positioned as required and then the cycle lock is placed through the opening. In the storage condition, the pivoting arm 47 is normally lowered against the spine member 28.

The configuration of the lower arm assembly 12 is substantially the same for each of the trunk configurations, whether "short" or "tall".

The lower arm assembly 12 illustrated includes a main rail 48 with a substantially U-shaped cross-section. Preferably, the main rail 48 defines a channel 49 which receives and guides the wheel during loading and unloading.

A pair of upright portions 50 are attached to the main rail 48, one to either side of one end of the main rail 48 and upstanding therefrom. The upright portions 50 of the lower arm assembly 12 are typically fixed to the upstanding sidewalls of the U channel of the main rail 48 and to the trunk assembly 11. The upright portions 50 are spaced apart in order to receive a wheel of the cycle therebetween. A roller stop or guide 51 is provided at an upper end of the upright portions 50 and between them.

A ramp member 52 is located in the channel 49 of the main rail 48 and the wheel of the cycle is forced over the ramp member 52 during loading and unloading. The ramp member 52 has a pair of portions which are angled toward one another to form a peak. This will allow the ramp 52 to operate in both directions to allow the wheel to pass if forced but to prevent accidental dislodgement. Typically, the ramp 52 member is spaced from the upright portions 50. As with the movable arm assembly 11, the lower arm assembly 12 is preferably provided with a pivoting arm 47 to be used as a locking member.

As illustrated in FIGS. 3 and 5, the main rail of the lower arm assembly 12 can be located spaced from the mounting surface and substantially parallel thereto when the lower arm assembly 12 is provided for the "tall" trunk assembly. In this case, an entry ramp 53 is normally provided at an outer end of the main rail 48. The entry ramp 53 illustrated has a pair of side members and one or more cross members linking the side members in order to provide a ladder like configuration to the entry ramp 53. As illustrated in FIGS. 3 and 5, the entry ramp 53 is normally angled outwardly from the end of the main rail 48 and functions to support the outer end of the main rail 48 above the ground surface.

As mentioned above, the movable arm assembly 11 preferably has the same radius has the fixed trunk assembly 10. The outer end of the movable arm assembly 12 can be drawn outwardly, and due to the radius and using the handle 40, will also swing downwardly until an outer end is adjacent to the ground allowing the cycle to be loaded and unloaded. The provision of the bearing carriages 29 on the arcuate spine member 28 of the movable arm assembly 12 allows a user to move the movable arm assembly 12 more easily and smoothly than prior art devices. This reduces the force required in order to move the movable arm assembly 12 between the extended and retracted conditions and also reduces the amount of force that must be applied to lift the movable arm assembly 12 into the elevated storage condition.

An alternative embodiment is illustrated in FIGS. 14 to 20. Whilst many of the components illustrated in this alternative embodiment of the same as the component illustrated in the previous embodiments, the alternative embodiment is more advanced and in particular, includes a ramp assembly in the movable arm illustrated in FIG. 15 in particular. The ramp assembly includes three ramp portions 54, 55, 56.

Figures 14, 15, 18, 19:
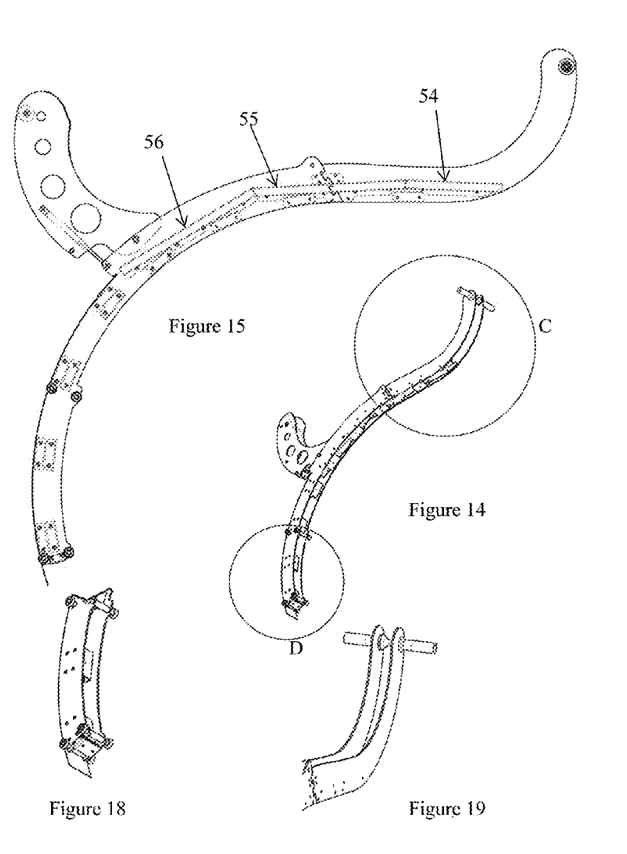
FIG. 14 is an isometric view of an alternative preferred embodiment of the movable arm.
FIG. 15 is a side elevation view of an alternative preferred embodiment illustrated in FIG. 14.
FIG. 18 is a detailed view of the portion of the alternative preferred embodiment illustrated in FIG. 14 identified as Detail D.
FIG. 19 is a detailed view of the end portion of the configuration illustrated in FIG. 17.
Figure 16:
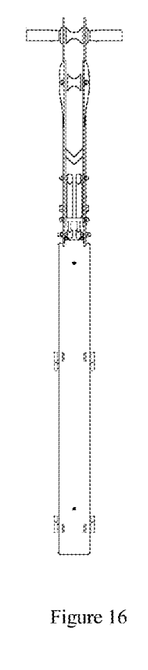
FIG. 16 an end elevation view of the alternative preferred embodiment illustrated in FIG. 14.
Figure 17:
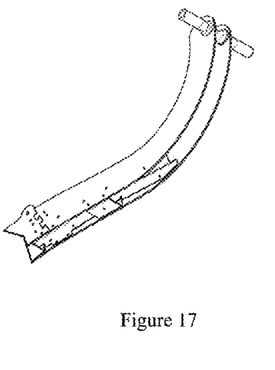
FIG. 17 is a detailed view of the portion of the alternative preferred embodiment illustrated in FIG. 14 identified as Detail C.

The other main difference is the slight alteration in the configuration of the handle as illustrated in FIGS. 16, 17 and 19 in particular. In the alternative embodiment, the handle includes a pair of laterally extending handles mounted coaxially with the roller of 41 rather than the configuration illustrated in FIG. 5.

Figure 20:
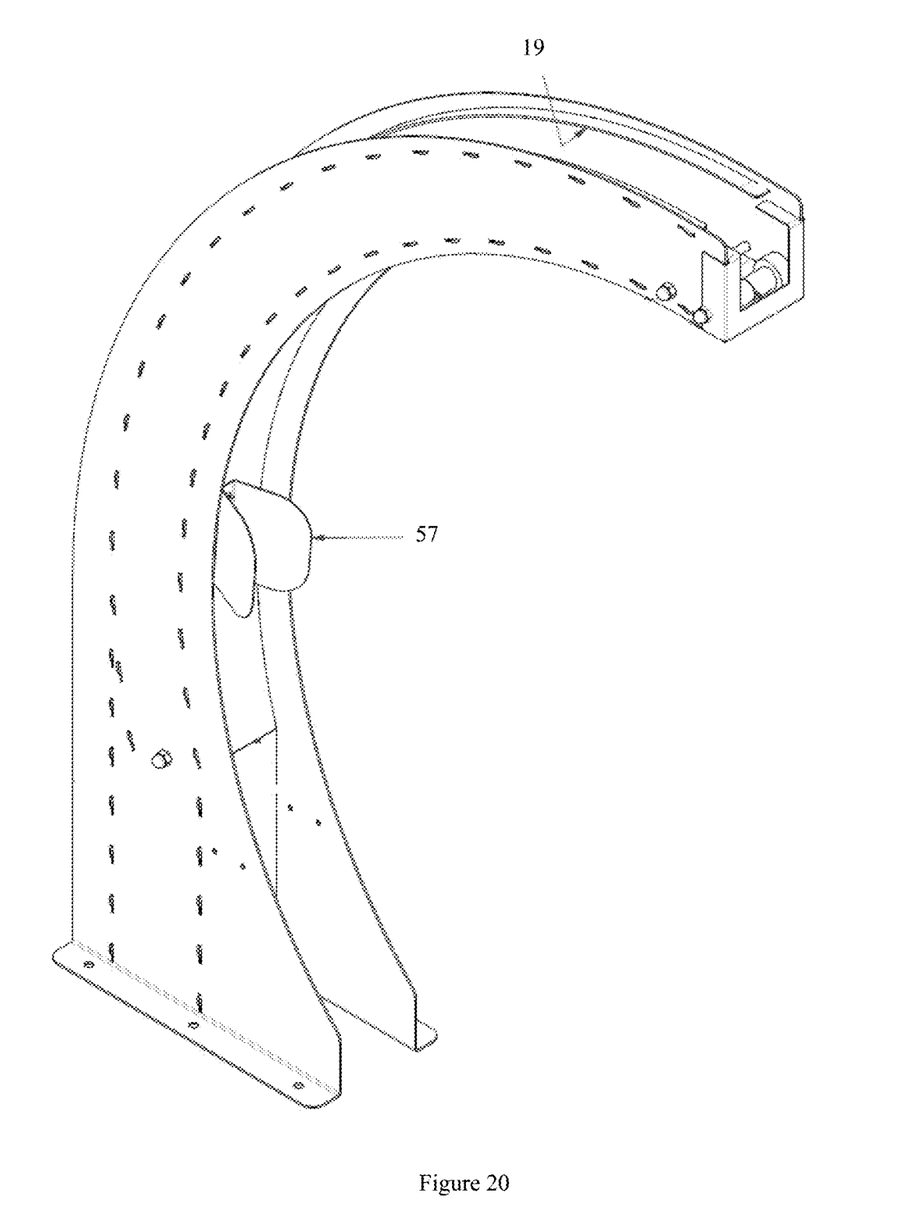
FIG. 20 is an isometric view of a fixed arm assembly according to an alternative preferred embodiment.

It is also to be noted from FIG. 20 that the fixed arm assembly is assembled in a particular manner. In particular, the side panels are removably located relative to the core of the fixed arm assembly using a plurality of clips or bayonet fittings.

A wheel receiving guide 57 is also provided which in this configuration acts as the at least one lower arm assembly.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A modular cycle storage apparatus including at least one fixed trunk assembly extending upwardly from a mounting surface, at least one arcuate movable arm assembly mounted relative to the fixed trunk assembly and movable relative thereto between an extended, lower position and a retracted, elevated position, and at least one lower arm assembly mounted relative to a lower portion of the fixed trunk assembly and beneath the arcuate movable arm assembly, each of the arcuate movable arm assembly and the lower arm assembly adapted to mount a cycle for at least temporary storage, the fixed trunk assembly having an arcuate portion, a substantially upright portion that spaces the arcuate portion from the mounting surface, a pair of spaced-apart sidewalls, and a pair of transversely extending infill sections located between the sidewalls to space the sidewalls apart and to define therewith a substantially rectangular volume within the fixed trunk assembly that receives at least a portion of the arcuate movable arm assembly and within which the arcuate movable arm assembly is movable between the extended lower position and the retracted elevated position.

2. A modular cycle storage apparatus as claimed in claim 1 wherein an outer or free end of the fixed trunk assembly has a least one roller provided to allow weight of the arcuate movable arm assembly to be spread more evenly to reduce load.

3. A modular cycle storage apparatus as claimed in claim 1 wherein one or more stop mechanisms are provided in relation to the fixed trunk assembly and bearings are provided on the arcuate movable arm assembly that abut one or more of the stop mechanisms in order to stop movement of the arcuate movable arm assembly at one or more design positions.

4. A modular cycle storage apparatus as claimed in claim 1 wherein the arcuate movable arm assembly defines an arc that corresponds to the arcuate portion of the fixed trunk assembly.

5. A modular cycle storage apparatus as claimed in claim 1 wherein the arcuate movable arm assembly is formed about an arcuate spine assembly which is box or rectangular shaped.

6. A modular cycle storage apparatus as claimed in claim 5 wherein one or more bearing carriages are fixed to the spine assembly to engage with the fixed trunk assembly to limit any lateral movement of the spine assembly.

7. A modular cycle storage apparatus as claimed in claim 5 wherein the arcuate movable arm assembly comprises a pair of arcuate sidewalls relative to the spine assembly and standing proud of the spine assembly above a vertical level of the spine assembly, on both sides of the spine assembly in order to define a channel which operates as a wheel guide or track.

8. A modular cycle storage apparatus as claimed in claim 1 wherein the arcuate movable arm assembly has an annodated or sigmoid shape.

9. A modular cycle storage apparatus as claimed in claim 1 wherein a portion of the arcuate movable arm assembly located furthest away from the fixed trunk assembly is upwardly extending to form an outer wheel catcher.

10. A modular cycle storage apparatus as claimed in claim 9 further including an inner wheel catcher or clamp assembly pivotally mounted to the arcuate movable arm assembly closest to the fixed trunk assembly about a lower pivot point, the inner wheel catcher or clamp assembly is biased towards the outer wheel catcher or clamp assembly for forcing a cycle, once loaded, into the outer wheel catcher thereby clamping the cycle between the inner and outer wheel catchers to hold the cycle.

11. A modular cycle storage apparatus as claimed in claim 10 wherein the inner wheel catcher is formed from a pair of spaced apart members, upstanding from the spine assembly.

12. A modular cycle storage apparatus as claimed in claim 1 further including a pivoting arm provided relative to the arcuate movable arm assembly and movable relative thereto between a storage condition and a use condition, the pivoting arm having at least one opening therethrough allowing a lock to be attached through the opening and about a portion of the cycle.

13. A modular cycle storage system including a plurality of modular cycle storage apparatus as claimed in claim 1 with some of the modular cycle storage apparatus being provided with a first type of the fixed trunk assembly and some of the apparatus provided with a second type of the fixed trunk assembly which is taller than the first type resulting in the arcuate portions of the respective fixed trunk assemblies being at different heights.

14. A modular cycle storage system as claimed in claim 13 wherein the fixed trunk assemblies of the first type alternate with fixed trunk assemblies of the second type in order to compact the system.

15. A modular cycle storage system as claimed in claim 1 wherein the fixed trunk assembly is a first fixed trunk assembly and the modular cycle storage system further comprises a second fixed trunk assembly having an upright portion and an arcuate portion, and the upright portion of the second fixed trunk assembly has a height different from the upright portion of the first fixed trunk assembly so that the arcuate portions of the first and second fixed trunk assemblies are at different heights from the mounting surface.

* * * * *